United States Patent [19]

Dörr et al.

[11] Patent Number: 4,671,904

[45] Date of Patent: Jun. 9, 1987

[54] METHOD FOR PRODUCING OXIDIC SINTERED NUCLEAR FUEL BODIES

[75] Inventors: Wolfgang Dörr, Herzogenaurach; Gerhard Gradel, Eckersdorf; Martin Peehs, Bubenreuth, all of Fed. Rep. of Germany

[73] Assignee: Kraftwerk Union Aktiengesellschaft, Mülheim, Fed. Rep. of Germany

[21] Appl. No.: 701,566

[22] Filed: Feb. 14, 1985

[30] Foreign Application Priority Data

Feb. 20, 1984 [DE] Fed. Rep. of Germany ....... 3406084

[51] Int. Cl.$^4$ ...................... G21C 21/02; G21C 21/00; G21C 3/00; C09K 11/04

[52] U.S. Cl. ..................................... 264/0.5; 252/637; 252/638; 252/643; 264/60; 264/125; 376/419; 423/15

[58] Field of Search ...................... 264/0.5, 56, 60, 63, 264/125; 423/11, 15; 252/638, 628, 636, 637, 643; 376/419, 4 R, 339

[56] References Cited

U.S. PATENT DOCUMENTS

| | | |
|---|---|---|
| 3,344,081 | 9/1967 | Elyard et al. ...................... 252/638 |
| 3,374,178 | 3/1968 | May et al. ........................... 252/638 |
| 3,862,908 | 1/1975 | Fitch et al. .......................... 423/11 |
| 4,094,738 | 6/1978 | Chubb ................................. 264/0.5 |
| 4,119,563 | 10/1978 | Kadner et al. ...................... 264/0.5 |
| 4,278,560 | 7/1981 | Sondermann ...................... 252/638 |
| 4,409,157 | 10/1983 | Haas et al. .......................... 423/15 |
| 4,512,939 | 4/1985 | Dörr et al. .......................... 264/0.5 |

FOREIGN PATENT DOCUMENTS 3144684 4/1983 Fed. Rep. of Germany .

*Primary Examiner*—Stephen J. Lechert, Jr.
*Assistant Examiner*—Howard J. Locker
*Attorney, Agent, or Firm*—Herbert L. Lerner; Laurence A. Greenberg

[57] ABSTRACT

$UO_2$ base powder exhibiting any specific surface and crystallite diameter properties is mixed with rare earth (SE) oxide-containing powder, the particles of which exhibit at least in one surface layer, a crystal lattice of the fluorite type, with the stoichiometric composition $(SE_{0.5}, U_{0.5})O_{2.00}$ and/or form it in sintering; and is compacted to form compacts which are sintered in a gas atmosphere with reducing action at 1500° C. to 1750° C. to form high-density sintered bodies.

6 Claims, No Drawings

METHOD FOR PRODUCING OXIDIC SINTERED NUCLEAR FUEL BODIES

BACKGROUND OF THE INVENTION

1. Field of the Invention

The invention relates to a method for producing oxidic sintered nuclear fuel bodies by mixing a base powder of $UO_2$ or a mixture of $UO_2$ and $PuO_2$, and powder containing rare-earth oxide, i.e. $SE_2O_3$ and, in particular, $Gd_2O_3$ as well as by subsequent compacting of the mixture of powders to form compacts and densifying these compacts by sintering in a gas atmosphere with reducing action at a temperature in the range from 1500° C. to 1750° C. . Rare-earth oxide in the German language is "Selten-Erdoxid" and is designated "$SE_2O_3$".

2. Description of the Prior Art

Allowed U.S. Application Ser. No. 431,615, filed Sept. 30, 1982, now U.S. Pat. No. 4,512,939 dated Apr. 23, 1985, 30, 1982 and German Patent No. 31 44 684, disclose compacting a mixture of a $UO_2$ base powder which has a specific surface in the range of 2 to 4.5 $m^2/g$ and/or a mean crystallite diameter in the range from 80 nm to 250 nm and $Gd_2O_3$ as an additive.

From this compacted powder, oxidic sintered nuclear fuel bodies are obtained which contain a rare-earth element (SE), e.g. gadolinium as a neutron-physically burnable neutron poison, and the sintered density of which amounts to more than 93% of the theoretically possible density. In a nuclear reactor in operation, these sintered nuclear fuel bodies therefore liberate relatively little gaseous or highly volatile nuclear fission products. Fuel rods which contain sintered nuclear fuel bodies obtained by the known methods, therefore probably will only develop a slight overpressure in the fuel rod cladding tubes. Also, no shrinkage and local overheating of these sintered nuclear fuel bodies occurs during operation in the nuclear reactor, so that fuel rod defects are avoided.

The $UO_2$ base powder used in the known method has a relatively small specific surface and/or a relatively large mean crystallite diameter. Base powder with these properties may be ungranulated uranium dioxide powder obtained directly by the so-called ADU process corresponding to "Gmelin Handbuch der anorganischen Chemie, Uranium, Supplemental volume A3, pages 99 to 101, 1981", or by the so-called AUC process according to "Gmelin Handbuch der anorganischen Chemie, Uranium, Supplemental volume A3, pages 101 to 104, 1981", which was given the relatively small specific surface and/or the relatively large mean crystallite diameter only by a correspondingly increased dwelling time of the powder under pyrohydrolysis conditions in the AUC process.

$UO_2$ base powder which is used for the known method is therefore manufactured from the start according to quite definite processes, to make it conform to the required specific surface and/or the required mean crystallite diameter. Different starting powder which is already present and does not have the required specific surface and/or the correct mean crystallite diameter, can lead to difficulties in the known method.

SUMMARY OF THE INVENTION

It is an object of the invention to make possible the use of $UO_2$ base powder with any range in the properties of specific surface and crystallite diameter for the production of high-density oxidic sintered nuclear fuel bodies containing rare-earth oxides.

With the foregoing and other objects in view, there is provided in accordance with the invention a method for producing sintered oxidic nuclear fuel bodies by mixing a base powder of $UO_2$ or a mixture of $UO_2$ and $PuO_2$ and powder containing rare-earth oxide designated $SE_2O_3$-containing powder, subsequent compacting of the powder mixture to form compacts and densifying these compacts by sintering in a gas atmosphere with reducing action at a temperature in the range from 1500° to 1750° C., the combination therewith of mixing with the base powder, a rare-earth-oxide-containing powder with powder particles which exhibit, at least in one surface layer, a crystal lattice of the fluorite type with the stoichiometric composition $(SE_{0.5}, U_{0.5}) O_{2.00}$.

Other features which are considered characteristic for the invention are set forth in the appended claims.

Although the invention is illustrated and described herein as embodied in a method for producing oxidic sintered nuclear fuel bodies, it is nevertheless not intended to be limited to the details shown, since various modifications may be made therein without departing from the spirit of the invention and within the scope and range of equivalents of the claims.

The invention, however, together with additional objects and advantages thereof will be best understood from the following description.

DETAILED DESCRIPTION OF THE INVENTION

A method of the type mentioned at the outset is characterized, according to the invention, by the feature that for mixing with the base powder, a rare-earth-containing powder is generated with powder particles which exhibit at least in one surface layer a crystal lattice of the fluorite type with the stoichiometric composition $(SE_{0.5}, U_{0.5}) O_{2.00}$ and/or generate it during the sintering.

A crystal lattice of the fluorite type for $UO_2$ is shown in FIG. 3.12 on page 30 of Olander: Fundamental Aspects of Nuclear Reactor Fuel Elements, TID-26711-P1, 1976, Energy Research and Development Administration (USA). There, the oxygen ions form a simple cubical lattice. In the crystal lattice of the fluorite type, powder particles generated for the method according to the invention, rare earths (SE) as well as uranium ions each occupy in the statistical average one-half of the lattice locations of the cubical-plane-centered (fcc) partial lattice. In such a crystal lattice of the fluorite type, the rare-earth, (SE), the uranium and also the oxygen ions are heavily diffusion-impeded, so that the formation of $(SE_y, U_{1-y}) O_{2.00}$-phases with y from 0 to 1 from the base powder is suppressed when the compacts are being sintered. For this reason, also a relatively high density of the sintered oxidic nuclear fuel bodies obtained from the compacts can be achieved, independently of the properties of the basic $UO_2$ powder used even with a relatively high rare-earth content, especially if $Gd_2O_3$ in the powder mixture to be compacted is 2 to 15% by weight, and preferably 4 to 8% by weight of the powder mixture. The share of the rare-earth oxide then has the same value in the sintered bodies obtained.

The invention and its advantages will now be explained in greater detail with the aid of three embodiment examples:

Rare-earth-oxide-containing powder intended for mixing with the base powder can advantageously be produced by annealing a rare-earth-oxide-containing starting powder with an $UO_2$-coating on the starting powder particles. For this purpose, for instance 50 g $Gd_2O_3$ starting powder which is spread out in a flat dish, is sprayed, if necessary, repeatedly, with an aqueous solution of uranyl nitrate, again uranyl citrate and/or uranyl oxalate by means of an aerosol spraying device. The dish advantageously is subjected to a shaking movement here, so that the powder particles are provided uniformly with the uranium-containing coating due to their vibration. Subsequently, the dish is heated up, and the uranium-containing coating on the powder particles is dried and, if necessary, freed of crystal water.

Thereupon, the $Gd_2O_3$-containing powder with the uranium-containing coating is calcined in a reducing hydrogen atmosphere at 500° to 1000° C. and is then annealed at a temperature of about 1500° C. for developing the crystal lattice of the fluorite type with the stoichiometric composition $(SE_{0.5}, U_{0.5}) O_{2.00}$, at least at the surface of the outer particles.

Thus produced $Gd_2O_3$-containing powder is then mixed with 660 g of the base powder which consists of pure $UO_2$ and which has a specific surface of 6.5 $m^2/g$ and a mean crystallite diameter of 50 nm and is compacted into compacts which contain 7% by weight $Gd_2O_3$. These compacts are then heated in a hydrogen atmosphere with reducing action for 2 to 5 hours to a temperature in the range of 1500° to 1750° C. The sintered bodies obtained have a density which is 96.5% of their theoretical density.

The rare-earth-oxide-containing powder intended for mixing with the base powder can advantageously also be produced from a mixture of rare-earth-oxide-containing starting powder and $UO_2$ powder by milling.

For this purpose, for instance $UO_2$ and $Gd_2O_3$ are mixed by hand in a ratio of 60:40 parts by weight which corresponds to a mol ratio of 50:50 and is subsequently milled intensively in a ball mill for 8 to 15 hours. 0.2 to 50 g distilled water, propane diol and/or zinc stearate are added as a milling aid to the mixture in the ball mill per 500 g of mixture.

The material to be milled is subjected, after being milled in a tumbling mixer to a build-up granulation, whereby flowable particles are produced which can be mixed and compacted with base powder of pure $UO_2$.

After mixing 100 g of the granulated material with 700 g of base powder of pure $UO_2$, which has the specific surface of 6.5 $m^2/g$ and a mean crystallite diameter of 50 nm, the mixture is compacted into compacts with a $Gd_2O_3$ content of 5% by weight. The compacts are sintered in a hydrogen atmosphere with reducing action at a temperature of 1500° to 1750° C. for 2 to 5 hours, developing sintered bodies. During this sintering operation, the granulates containing the $UO_2$ and $Gd_2O_3$ pass, at least at their surface, into the crystal lattice of the fluorite type with the composition $(Gd_{0.5}, U_{0.5})_{2.00}$. The sintered bodies obtained have a $Gd_2O_3$ content of 5% by weight and a sintered density of 97.2% of their theoretical density.

The rare-earth-oxide-containing powder intended for being mixed with the base powder of $UO_2$ can also be produced advantageously by common precipitation from a solution, in which uranium and the rare earth are dissolved.

For this purpose, for instance 60 g $UO_2$ powder and 40 g $Gd_2O_3$ which corresponds to a mol ratio of 50:50, are dissolved in nitric acid. Ammonium carbonate solution is added to the nitric acid solution. Then, ammonia ($NH_3$) and carbon dioxide ($CO_2$) gas are simultaneously introduced into the solution and a precipitate containing gadolinium and uranium is precipitated.

This precipitate has the molar composition of gadolinium and uranium in the ratio 1:1. The precipitate is subjected to a calcining process carried out at a temperature of 500° to 650° C. in a reducing hydrogen atmosphere. The powder particles of the resulting powder have a crystal lattice of the fluoride type with the stoichiometric composition $U_{0.5}Gd_{0.5}) O_{2.00}$. powder is mixed with 344 g of base powder of pure $UO_2$ which has a specific surface of 6.5 $m^2/g$ and a mean crystallite diameter of 50 nm is compacted and sintered for 2 to 5 hours in a hydrogen atmosphere with reducing action at a temperature in the range of 1500° C. to 1750° C. The sintered bodies obtained have a $Gd_2O_3$ content of 9% by weight and a density of 97.5% of their theoretical density.

The foregoing is a description corresponding, in substance, to German application P No. 34 06 084.7, dated Feb. 20, 1984, international priority of which is being claimed for the instant application, and which is hereby made part of this application. Any material discrepancies between the foregoing specification and the specification of the aforementioned corresponding German application are to be resolved in favor of the latter.

There is claimed:

1. Method for producing sintered oxidic nuclear fuel bodies by mixing a base powder of $UO_2$ or a mixture of $UO_2$ and $PuO_2$ and powder containing rare-earth oxide designated $SE_2O_3$-containing powder, subsequent compacting of the powder mixture to form compacts and densifing these compacts by sintering in a gas atmosphere with reducing action at a temperature in the range from 1500° to 1750° C., the combination therewith of mixing with the base powder, a rare-earth-oxide-containing powder with powder particles which exhibit, at least in one surface layer, a crystal lattice of the fluorite type with the stoichiometric composition $(SE_{0.5}, U_{0.5}) O_{2.00}$, wherein the rare-earth-oxide-containing powder exhibiting a crystal lattice of the fluorite type with the stoichiometric composition $(SE_{0.5}, U_{0.5}) O_{2.00}$ is generated by coating a starting powder containing a rare earth oxide with an $UO_2$ coating on the starting powder particles and annealing the $UO_2$- coated powder.

2. Method for producing sintered oxidic nuclear fuel bodies by mixing a base powder of $UO_2$ or a mixture of $UO_2$ and $PuO_2$ and powder containing rare-earth oxide designated $SE_2O_3$-containing powder, subsequent compacting of the powder mixture to form compacts and densifing these compacts by sintering in a gas atmosphere with reducing action at a temperature in the range from 1500° to 1750° C., the combination therewith of mixing wiht the base powder, a rare-earth-oxide-containing powder with powder particles which exhibit, at least in one surface layer, a crystal lattice of the fluorite type with the stoichiometric composition $(SE_{0.5}, U_{0.5}) O_{2.00}$, wherein the rare-earth-oxide-containing powder for mixing with said base powder is produced from a mixture of rare earth oxide-containing starting powder and $UO_2$ powder in approximately equimolar proportions by milling and the crystal lattice of the fluorite type with the stoichiometric composition $(SE_{0.5} \cdot U_{0.5}) O_{2.00}$ is formed during said sintering.

3. Method for producing sintered oxidic nuclear fuel bodies by mixing a base powder $UO_2$ or a mixture of $UO_2$ and $PuO_2$ and powder containing rare-earth oxide designated $SE_2O_3$-containing powder, subsequent compacting of the powder mixture to form compacts and densifying these compacts by sintering in a gas atmosphere with reducing action at a temperature in the range from 1500° to 1750° C., the combination therewith of mixing with the base powder, a rare-earth-oxide-containing powder with powder particles which exhibit, at least in one surface layer, a crystal lattice of the fluorite type wiht the stoichiometric composition $(SE_{0.5}, U_{0.5}) O_{2.00}$, wherein the rare-earth-oxide-containing powder is generated by common precipitation from a solution, in which uranium and the rare earth are dissolved in approximately equimolar proportions and the precipitate calcined to produce the rare-earth-oxide-containing powder exhibiting a crystal lattice of the fluorite type with the stoichiometric composition $(SE_{0.5}, U_{0.5}) O_{2.00}$.

4. Method according to claim 1, wherein the powder containing rare-earth oxide is $Gd_2O_3$-containing powder.

5. Method according to claim 2, wherein the powder containing rare-earth oxide is $Gd_2O_3$-containing powder.

6. Method according to claim 3, wherein the powder containing rare-earth oxide is $Gd_2O_3$-containing powder.

* * * * *